US010728217B2

(12) United States Patent
Phillips

(10) Patent No.: US 10,728,217 B2
(45) Date of Patent: *Jul. 28, 2020

(54) ASSESSING RISK ASSOCIATED WITH FIREWALL RULES

(71) Applicant: AT&T Global Network Services (U.K.) B.V., The Hague (NL)

(72) Inventor: Ian Phillips, Waterlooville (GB)

(73) Assignee: AT&T GLOBAL NETWORK SERVICES (U.K.) B.V., The Hague (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,261

(22) Filed: Jan. 29, 2019

(65) Prior Publication Data

US 2019/0173845 A1 Jun. 6, 2019

Related U.S. Application Data

(63) Continuation of application No. 15/215,792, filed on Jul. 21, 2016, now Pat. No. 10,237,240.

(51) Int. Cl.
*H04L 29/06* (2006.01)
(52) U.S. Cl.
CPC ...... *H04L 63/0263* (2013.01); *H04L 63/0236* (2013.01); *H04L 63/1433* (2013.01)
(58) Field of Classification Search
CPC ............ H04L 63/0263; H04L 63/1433; H04L 63/0236
See application file for complete search history.

(56) References Cited

U.S. PATENT DOCUMENTS 6,944,183 B1 9/2005 Iyer et al.
8,181,250 B2 5/2012 Rafalovich et al.
(Continued)

FOREIGN PATENT DOCUMENTS

WO 2011/072289 A2 6/2011
WO 2015/199719 A1 12/2015
WO 2016/038139 A1 3/2016

OTHER PUBLICATIONS

Non-Final Office Action received for U.S. Appl. No. 15/215,792 dated Jun. 12, 2018, 59 pages.
(Continued)

*Primary Examiner* — Christopher C Harris
(74) *Attorney, Agent, or Firm* — Amin, Turocy & Watson, LLP

(57) ABSTRACT

Techniques for assessing risk associated with firewall rules are provided. In one implementation, a method includes receiving a request for the network to apply a firewall policy rule to control traffic to a machine associated with the network, wherein the firewall policy rule comprises information that identifies a remote address from which the traffic can originate and a type of the traffic. The method further includes determining a remote address risk value representative of a first degree of security risk associated with allowing the traffic to access the machine in response to the traffic being determined to originate from the remote address; determining a traffic type risk value representative of a second degree of security risk associated with allowing the type of traffic to access the machine; and determining a total risk value based on a combination of the remote address risk value and the traffic type risk value.

20 Claims, 10 Drawing Sheets

(56) References Cited

U.S. PATENT DOCUMENTS

| | | |
|---|---|---|
| 8,353,021 B1 | 1/2013 | Satish et al. |
| 8,423,483 B2 | 4/2013 | Sadeh-Koniecpol et al. |
| 8,464,075 B2 | 6/2013 | Gnanasambandam et al. |
| 8,832,832 B1 | 9/2014 | Visbal |
| 9,286,103 B2 | 3/2016 | Acharya et al. |
| 9,319,913 B2 | 4/2016 | Raleigh et al. |
| 2006/0129587 A1 | 6/2006 | Renfro et al. |
| 2009/0158386 A1 | 6/2009 | Lee |
| 2010/0293617 A1 | 11/2010 | Wool |
| 2011/0055923 A1 | 3/2011 | Thomas |
| 2014/0075564 A1 | 3/2014 | Singla et al. |
| 2014/0310603 A1 | 10/2014 | Flavel et al. |
| 2016/0294858 A1 | 10/2016 | Woolward et al. |
| 2016/0352765 A1* | 12/2016 | Mermoud ........... H04L 63/1425 |
| 2016/0359872 A1 | 12/2016 | Yadav et al. |
| 2017/0250951 A1 | 8/2017 | Wang et al. |

OTHER PUBLICATIONS

Li, Yang, "Cisco Firewall Risk Score Calculator", GitHub, Jun. 2012, 3 pages.

Al-Haj et al., "Measuring Firewall Security", IEEE, Dec. 2011, 4 pages.

Luo et al., "On Data and Virtualization Security Risks and Solutions of Cloud Computing", Journal of Networks, vol. 9, No. 3, Mar. 2014, pp. 571-581.

\* cited by examiner

800

ANALZYING, BY A DEVICE OF A NETWORK AND COMPRISING A PROCESSOR, FIREWALL POLICY INFORMATION DEFINING TRAFFIC AUTHORIZED TO BE SENT FROM A MACHINE OF THE NETWORK, THE FIREWALL POLICY INFORMATION IDENTIFYING A REMOTE ADDRESS FOR A DESTINATION TO WHICH THE TRAFFIC IS CAPABLE OF BEING SENT AND A TYPE OF THE TRAFFIC, WHEREIN THE ANALYZING COMPRISES: — 802

804 — DETERMINING A REMOTE ADDRESS RISK VALUE REPRESENTATIVE OF A FIRST DEGREE OF SECURITY RISK ASSOCIATED WITH ALLOWING THE TRAFFIC TO BE SENT FROM THE MACHINE TO THE DESTINATION ASSOCIATED WITH THE REMOTE ADDRESS

806 — DETERMINING A TRAFFIC TYPE RISK VALUE REPRESENTATIVE OF A SECOND DEGREE OF SECURITY RISK ASSOCIATED WITH ALLOWING THE TYPE OF TRAFFIC TO BE SENT FROM THE MACHINE

808 — DETERMINING A TOTAL RISK VALUE BASED ON A FUNCTION OF THE REMOTE ADDRESS RISK VALUE AND THE TRAFFIC TYPE RISK VALUE

810 — DIRECTING, BY THE DEVICE, A NETWORK DEVICE OF THE NETWORK TO APPLY THE FIREWALL POLICY INFORMATION TO CONTROL ACCESS OF THE TRAFFIC TO THE MACHINE IN RESPONSE TO A FIRST DETERMINATION THAT THE FIREWALL POLICY INFORMATION IS ASSOCIATED WITH AN ACCEPTABLE DEGREE OF SECURITY RISK BASED ON THE TOTAL RISK VALUE BEING LESS THAN A THRESHOLD RISK VALUE

902: EVALUATING, BY A DEVICE OF A NETWORK AND COMPRISING A PROCESSOR, A FIREWALL POLICY RULE DEFINING TRAFFIC AUTHORIZED TO ACCESS A MACHINE OF THE NETWORK, THE FIREWALL POLICY RULE COMPRISING INFORMATION IDENTIFYING A REMOTE ADDRESS FROM WHICH THE TRAFFIC ORIGINATES AND A TYPE OF THE TRAFFIC, WHEREIN THE EVALUATING COMPRISES:

904: DETERMINING A REMOTE ADDRESS RISK VALUE REPRESENTATIVE OF A FIRST DEGREE OF SECURITY RISK ASSOCIATED WITH ALLOWING THE TRAFFIC TO ACCESS THE MACHINE WHEN ORIGINATING FROM THE REMOTE ADDRESS

906: DETERMINING A TRAFFIC TYPE RISK VALUE REPRESENTATIVE OF A SECOND DEGREE OF SECURITY RISK ASSOCIATED WITH ALLOWING THE TYPE OF TRAFFIC TO ACCESS THE MACHINE

909: DETERMINING A TOTAL RISK VALUE BASED ON A COMBINATION OF THE REMOTE ADDRESS RISK VALUE AND THE TRAFFIC TYPE RISK VALUE

910: REJECTING, BY THE DEVICE, THE FIREWALL POLICY RULE BASED ON A DETERMINATION THAT THE FIREWALL POLICY RULE IS ASSOCIATED WITH AN UNACCEPTABLE DEGREE OF SECURITY RISK BASED ON COMPARISON OF THE TOTAL RISK VALUE WITH A THRESHOLD RISK VALUE

ASSESSING RISK ASSOCIATED WITH FIREWALL RULES

RELATED APPLICATION

The subject patent application is a continuation of, and claims priority to, U.S. patent application Ser. No. 15/215,792, filed Jul. 21, 2016, and entitled "ASSESSING RISK ASSOCIATED WITH FIREWALL RULES," the entirety of which application is hereby incorporated by reference herein.

TECHNICAL FIELD

The subject disclosure relates generally to communications systems that facilitate assessing risk associated with firewall rules.

BACKGROUND

A "firewall" refers to a network security measure that controls incoming and outgoing network traffic based on a set of permit and deny rules or conditions, referred to herein as firewall policy rules. The task of defining and maintaining network firewall policies has traditionally fallen to a security specialist or team of security specialists within the organization that owns or manages the network. In various existing networks, the network employs a formal request process which will allow security specialists of the network to add, modify, or remove different firewall policy rules associated with different machines/devices or sub-networks (or subnets) of the network. Each request is usually manually reviewed by one or more of the security specialists before being added to the firewall policy or rejected for some business or security-related reason.

Large companies are rapidly moving toward shared environments, comprising cloud models, where different software applications and other services for different users, companies or organizations can be hosted, managed and ran at a remote location and made available to a plurality of other users via network. These applications and services can reside in physical machines or devices of the network as well as in virtual machines ("VMs") or devices of the network that can have resources added or removed on demand, instantiated, quiesced, and re-instantiated on other peer hardware. These types of solutions provide flexibility and can optimize individual devices for maximum utilization and return-on-investment (ROI) compared to fixed hardware allocation.

The move towards cloud computing disrupts the traditional firewall policy implementation model by transferring much of the security responsibility directly to the owner, creator or manager of the cloud based application or service. These users are not typically security experts, even if they have years of experience in the information technology, software engineering or data processing industries. This can easily lead an inexperienced user to misconfigure the firewall policies associated with their application or service, leaving their application or service and associated information vulnerable to a remote attacker.

BRIEF DESCRIPTION OF THE DRAWINGS

FIGS. 7, 8 and 9 illustrate example flowcharts of methods that facilitate assessing risk associated with firewall rules in accordance with one or more embodiments described herein.

DETAILED DESCRIPTION

Figure 1:
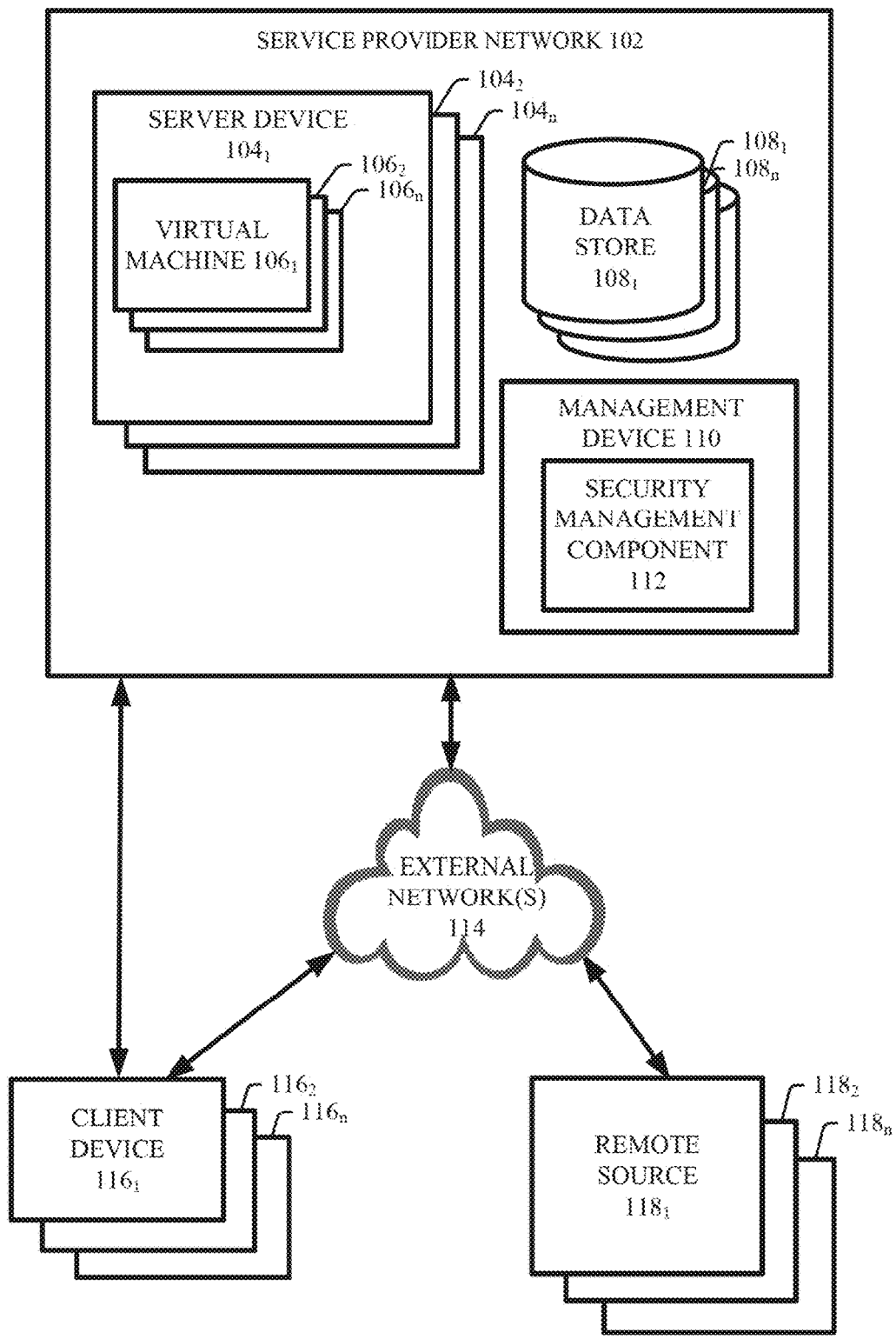
FIG. 1 illustrates an example block diagram of a communication system including a service provider network that facilitates assessing risk associated with firewall rules in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. As used herein, the terms "server" and "server device" are interchangeable.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

One or more embodiments described herein can provide systems, methods, apparatus and/or machine-readable storage media that can facilitate assessing risk associated with a network firewall rule. The disclosed techniques are particularly useful for determining security risk associated with user-defined firewall rules provided for applications or services deployed in a cloud computing environment or a shared/farm/cloud solution, in real-time (e.g., immediately upon reception of the user-defined firewall rule).

In a cloud environment, potentially inexperienced users (from a security perspective) may be handed the responsibility of defining firewall rules for the applications or services they deploy in a cloud environment, possibly for the first time. The disclosed systems, methods apparatus and/or machine-readable storage media provide an automated process for determining whether a user defined firewall rule for their application or service is associated with an acceptable degree of security risk. The automated process involves analyzing individual variables of the firewall rule, including but not limited to: the directionality of the firewall rule (e.g., ingress or egress), the remote address from which traffic can be received or to which the traffic can be sent, and the type of the traffic, wherein the type of traffic includes one or more protocol and port or port range combinations associated with the traffic. In various embodiments, ingress and egress firewall rules are processed separately. Security risk values can further be determined for each of the remote address and traffic type variables based on information previously associated with the respective variables regarding an amount of security risk associated therewith, a quantity of machines/devices associated with the remote address variable, and/or quantity of protocol-port combinations associated with the traffic type variable. A total risk value for the firewall rule can further be determined based on a function of a combination of the security risk values for the respective variables.

The disclosed systems, methods apparatus and/or machine-readable storage media can further accept and implement the firewall rule, reject the firewall rule, modify the firewall rule and/or send the firewall rule to another system for deeper review, based on comparison of the total risk value with one or more defined threshold risk values. Accordingly, the subject systems, methods, apparatus and/or machine-readable storage media provide an automated process which, once setup, can be completed immediately upon receipt of a firewall rule (e.g., in under a second). Therefore, the subject systems, methods, apparatus and/or machine-readable storage media provide a substantial improvement in firewall policy design and implementation, which is typically a manual-driven process, which can take anything from a few hours to a few days to complete. The subject systems, methods, apparatus and/or machine-readable storage media provide further provide a "safety net" protecting inexperienced users (from a security point of view) from exposing their virtual assets to threats posed by bad actors elsewhere on the network.

In one embodiment, a method is provided. The method can include processing, by a device of a network including a processor, a request for the device of the network to apply a firewall policy rule to control traffic to a machine of the network, wherein the firewall policy rule comprises information that identifies a remote address from which the traffic is able to originate and a type of the traffic. The method can further include, analyzing, by the device, the information based on the request. In various implementations, the analyzing can include, determining a remote address risk value representative of a first degree of security risk associated with allowing the traffic to access the machine in response to the traffic being determined to originate from the remote address. The analyzing can further include determining a traffic type risk value representative of a second degree of security risk associated with allowing the type of traffic to access the machine, and further determining a total risk value based on a result of a combination of the remote address risk value and the traffic type risk value.

In another embodiment, a system is provided that includes a processor and a memory that stores executable instructions that, when executed by the processor, facilitate performance of various operations. These operations can include analyzing firewall policy information defining traffic authorized to be sent from a machine of a network, the firewall policy information identifying a remote address for a destination to which the traffic is capable of being sent and a type of the traffic. In various implementations, the analyzing can include determining a remote address risk value representative of a first degree of security risk associated with allowing the traffic to be sent from the machine to the destination associated with the remote address, and determining a traffic type risk value representative of a second degree of security risk associated with allowing the type of traffic to be sent from the machine. The analyzing can further include determining a total risk value based on a function of the remote address risk value and the traffic type risk value. The operations can further include directing a network device of the network to apply the firewall policy information to control access of the traffic to the machine in response to a first determination that the firewall policy information is associated with an acceptable degree of security risk based on the total risk value being less than a threshold risk value.

In another embodiment, a machine-readable storage medium is provided. The machine-readable storage medium can include executable instructions that, when executed by a processor, facilitate performance of operations. These operations can include evaluating a firewall policy rule defining traffic authorized to access a machine of a network, the firewall policy rule comprising information identifying a remote address from which the traffic originates and a type of the traffic. In various embodiments, the evaluating can include determining a remote address risk value representative of a first degree of security risk associated with allowing the traffic to access the machine when originating from the remote address. The evaluating can further include determining a traffic type risk value representative of a second degree of security risk associated with allowing the type of traffic to access the machine, and determining a total risk value based on a combination of the remote address risk value and the traffic type risk value. The operations can further include rejecting the firewall policy rule based on a determination that the firewall policy rule is associated with an unacceptable degree of security risk based on comparison of the total risk value with a threshold risk value.

Turning now to the drawings, FIG. 1 illustrates an example block diagram of a communication system 100 including a service provider network that facilitates assessing risk associated with firewall rules in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The term "virtual" as used herein refers to a software implementation/embodiment of a physical computer or physical device/machine. A virtual machine (VM) can have an operating system, applications, files and the like. The term "virtual image" means an electronic copy of a VM or a virtual hard disk file that provides a template for generating a VM (but may or may not have one or more configurations of a particular VM). Central processing units (CPUs) can be added to or removed from a VM from time to time, or the VM can be relocated/migrated to another physical device.

System 100 includes a service provider network 102, one or more client devices $116_{1-n}$ and one or more remote sources $118_{1-n}$, (wherein the variable n can include any number). The client devices $116_{1-n}$ can include any suitable computing device configured to communicate with the service provider network 102 either directly or via one or more external networks 114 to receive one or more services provided by the service provider network 102. For example, the one or more client devices $116_{1-n}$ can include but are not limited to, a handheld computing device, a mobile phone, a smart phone, a tablet personal computer (PC), a laptop computer, a desktop computer, a personal digital assistant (PDA) and/or a wearable device. In various embodiments, client devices $116_{1-n}$ include devices associated with users and employed by the users to communicate with the service provider network 102. In some embodiments, at least some of the client devices $116_{1-n}$ can be included in the service provider network 102 in embodiments in which the service provider network includes a private network, a local area network (LAN), a private cloud, or a hybrid could. For example, according to these embodiments, at least some of the one or more client devices $116_{1-n}$ can connect to the service provider network 102 either directly, via a virtual private network (VPN) using the one or more external networks 114 (e.g., the Internet, a cellular network, etc.), or the like.

The one or more remote sources $118_{1-n}$ can include physical or virtual devices, machines, systems, networks (e.g., including cloud computing networks) and/or subnets that are not included in the service provider network 102. In one or more embodiments, the remote sources $118_{1-n}$ can be configured to access the service provider network 102 via one or more external networks 114 (e.g., the Internet, a cellular network, etc.). In some implementations, the service provider network 102 can be configured to provide services (e.g., software based services, platform based services, storage based services, infrastructure based services, etc.) and traffic to at least some of one or more remote sources $118_{1-n}$. In other implementations, the service provider network 102 can be configured to receive services (e.g., software based services, platform based services, storage based services, infrastructure based services, etc.) and traffic from at least some of the one or more remote sources $118_{1-n}$. Still in other implementations, the service provider network 102 can be configured to deny provision or reception of services and traffic to or from at least some of the one or more remote sources $118_{1-n}$.

The service provider network 102 can include a network of communicatively coupled devices or machines associated with one or more organizations or enterprises and configured to provide various services. These services can include for example, application based services, storage based services, infrastructure based services, platform based services, communication based services, and the like. In some implantations, these services can be associated with a single organization or entity. In other implementations, these services can be associated with various different organizations or entities. In various embodiments, the service provider network 102 can include one or more physical or virtual machines, devices or subnets that may be accessed by at least some of the one or more client devices $116_{1-n}$ and the one or more remote sources $118_{1-n}$ (e.g., using a web-browser). For example, the service provider network 102 can include one or more server devices $104_{1-n}$ which can respectively include one or more virtual machines (VMs) $106_{1-n}$ (e.g., the VMs can be installed on the sever devices $104_{1-n}$). In some implementations, some of the one or more server devices $106_{1-n}$ are also virtual devices. The service provider network 102 can also include one or more physical or virtual data stores $108_{1-n}$ and a physical or virtual management device 110. In some implementations, the service provider network 102 can also include other types of peripheral electronic devices or machines (not shown) that can be accessible and/or controllable via the one or more networks 114 (e.g., printers, displays, cameras, sensors, robots, implantable medical devices (IMD), etc.). The machines, devices and subnets of the service network provider 102 can be communicatively coupled via one or more wires or wirelessly via one or more internal networks (e.g., a local area network (LAN), a personal area network (PAN), etc).

In some implementations, the server devices $104_{1-n}$ and/or the VMs $106_{1-n}$ can include software applications that can be accessed on-demand by one or more remote client devices $116_{1-n}$, and remote sources $118_{1-n}$ either directly or via one or more networks 114. For example, the software applications can include but are not limited to, applications related to security, data analytics, data processing, networking, social networking, gaming, streaming media, file or information storage and the like. In some embodiments, two or more VMs (associated with the same or different server devices $104_{1-n}$) can provide the same application or service. In other embodiments, one or more, or, in some embodiments, each, VM $106_{1-n}$ of the service provider network 102 can provide a different application or service. From time to time, the one or more VMs $106_{1-n}$ can be re-allocated to different ones of the server devices $104_{1-n}$ based on demand, resources, application requested and the like. Further, in various different embodiments, the one or more VMs $106_{1-n}$ can be flexibly allocated/re-allocated/migrated from one server device $104_{1-n}$ to another server device $104_{1-n}$ to obtain technical efficiencies, meet demand and/or based on licensing requirements that may be resultant from software vendors associated with the services provided via the one or more VMs $106_{1-n}$.

The one or more networks 114 can be or include a wide area network (WAN), e.g., the Internet)), a LAN, a personal area network (PAN), or the like. In some embodiments, various components, devices or machines of system 100 can communicate using disparate networks. For example, in one implementation, some of the one or more client devices $116_{1-n}$ can be configured to communicate with the service provider network 102, and vice versa, using a LAN (e.g., an intranet), while the one or more remote sources $118_{1-n}$ and other ones of the one or more client devices $116_{1-n}$ can be configured to communicate with the service provider network 102, and vice versa, via a WAN. The one or more client devices $116_{1-n}$ and/or the one or more remote sources $118_{1-n}$ can also communicate with the service provider network 102 and vice versa via the one or more networks 114 using virtually any desired wired or wireless technology communication protocol, including but not limited to: cellular technology protocols, Internet protocol (IP), transmission control protocol (TCP), user datagram protocol (UDP), post office protocol (POP), simple mail transfer protocol (SMTP), hypertext transfer protocol (HTTP), file transfer protocol (FTP), session initiation protocol (SIP) based protocol, BLUETOOTH® communication protocol, ZIGBEE® protocol, RF4CE protocol, WirelessHART protocol, a 6LoWPAN (IPv6 over Low power Wireless Personal Area Networks) protocol, Z-Wave protocol, ANT protocol, an ultra-wideband (UWB) standard protocol, and/or other proprietary and non-proprietary communication protocols.

In various embodiments, service provider network 102 can be or include a cloud service provider. The term "cloud service provider" is used herein to refer to an organization, company, or group of organizations/companies that offers some component of "cloud computing," such as software as a service (SaaS), infrastructure as a service (IaaS), or platform as a service (PaaS) to other businesses or individuals. "Cloud computing" is a kind of network-based computing that provides shared processing resources and data to computers and other devices on-demand via a network (e.g., the one or more networks 114). It is a model for enabling ubiquitous, on-demand access to a shared pool of configurable computing resources (e.g., networks, servers, storage, applications and services), which can be rapidly provisioned and released with minimal management effort. Cloud computing and storage solutions provide users and enterprises with various capabilities to store and process their data in third-party data centers.

In embodiments in which the service provider network 102 is or includes a cloud service provider, the service provider network 102 can employ a private cloud network (e.g., based on OpenStack™ or VMware™ technology), a community cloud network, a public cloud network (e.g., Amazon Web Services™, Azure™, Google Cloud™, and the like), a hybrid cloud network, or the like. With a private cloud network, the infrastructure of the service provider network 102 is operated solely for a particular organization or enterprise. It may be managed by the organization or a third party and may exist on-premises or off-premises. With a community cloud network, the infrastructure of the service provider network 102 is shared by several organizations and supports a specific community that has shared concerns (e.g., mission, security requirements, policy, and compliance considerations). It may be managed by the organizations or a third party and may exist on-premises or off-premises. With a public cloud network, the cloud infrastructure of the service provider network 102 is made available to the general public or a large industry group and is owned by an organization selling cloud services. With a hybrid cloud network, the cloud infrastructure of the service provider network 102 is a composition of two or more clouds (private, community, or public) that remain unique entities but are bound together by standardized or proprietary technology that enables data and application portability (e.g., cloud bursting for load-balancing between clouds).

A cloud service provider (e.g., service provider network 102) is service oriented with a focus on statelessness, low coupling, modularity, and semantic interoperability. At the heart of cloud computing is an infrastructure that includes a network of interconnected nodes (e.g., the one or more server devices $104_{1-n}$, the one or more VMs $106_{1-n}$, the one or more data stores $108_{1-n}$, the management device 110, etc.). These nodes may also be grouped (not shown) physically or virtually into one or more subnets. This allows the cloud service provider (e.g., service provider network 102) to offer infrastructure, platforms and/or software as services for which a cloud consumer (e.g., at least some of the one or more client devices $116_{1-n}$ and/or at least some of the remote sources $118_{1-n}$) does not need to maintain resources on a local computing device.

Figure 2:
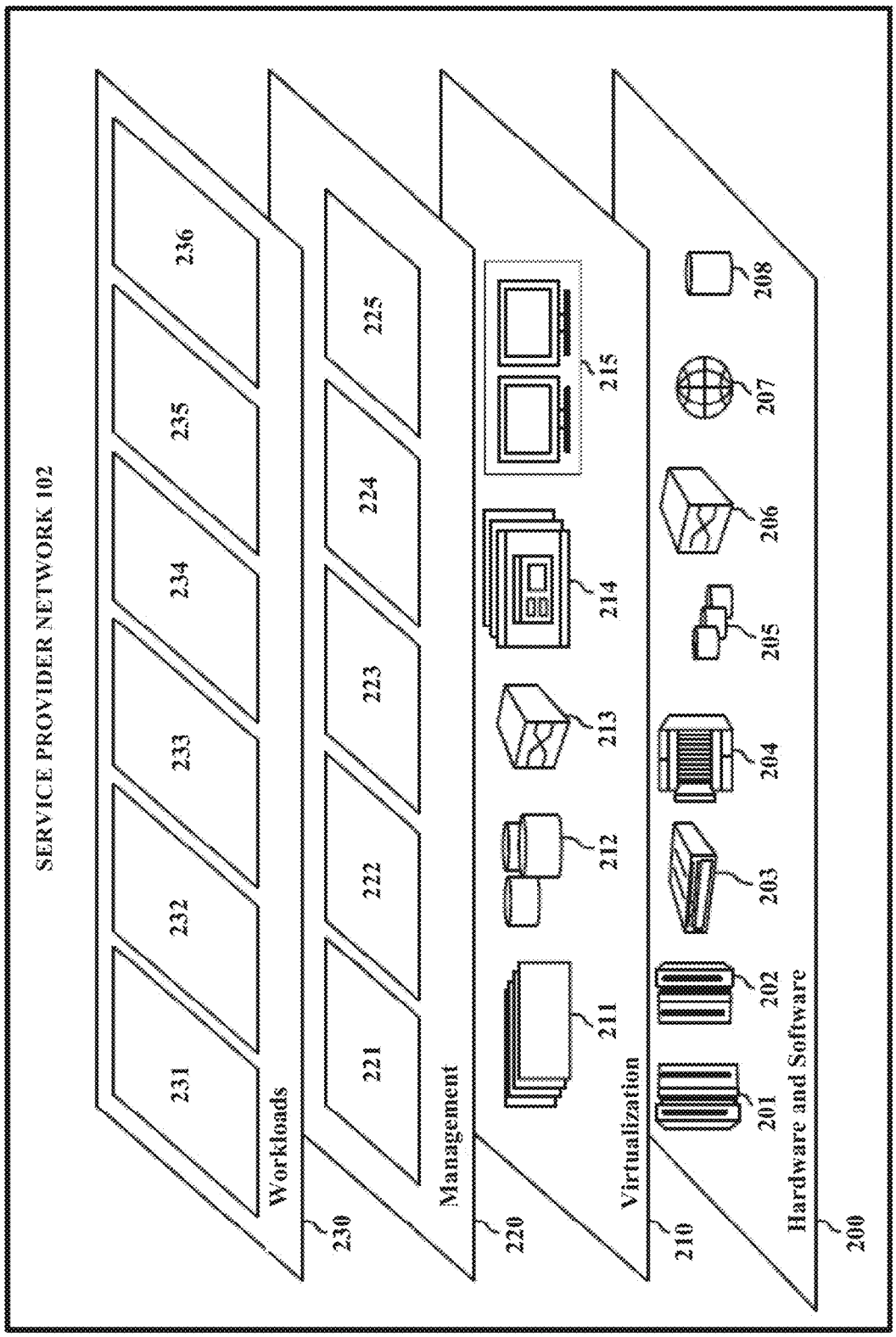
FIG. 2 illustrates a set of functional abstraction layers that can be provided by a cloud service provider in accordance with various aspects and embodiments described herein.

FIG. 2 illustrates a set of functional abstraction layers that can be provided by a cloud service provider (e.g., service provider network 102) in accordance with various aspects and embodiments described herein. These layers can include for example, a hardware and software layer 200, a virtualization layer 210, a management layer 220, and a workload layer 230. The hardware and software layer 200 can include hardware and software components. Some examples hardware components can include but are not limited to, mainframes 201, reduced instruction set computer (RISC) architecture based servers 202, servers 203, blade servers 204, storage devices 205, and networks and networking components 206. In some embodiments, software components can include network application server software 207 and database software 208.

The virtualization layer 210 provides an abstraction layer from which the virtual entities may be provided, including but not limited to: virtual servers 211, virtual storage 212, virtual networks 213 (e.g., including virtual private networks), virtual machines 214, and virtual clients 215. The management layer 220 can provide various managerial functions associated with the service provider network 102 in association with operating as a cloud service provider. For example, the management layer 220 can provide resource provisioning 221 that includes the dynamic procurement of computing resources and other resources that are utilized to perform tasks within the cloud service provider. The management layer 220 can also perform metering and pricing 222 which involves cost tracking as resources are utilized within the cloud computing environment, and billing or invoicing for consumption of these resources. In one example, these resources may include application software licenses. The user portal 223 can provide users and administrators access to the cloud service provider network 102 via an application program interface (API), website, dashboard, etc., provided by the service provider network 102. The service level management 224 can provide cloud computing resource allocation and management such that required service levels are met. The management layer 220 can also provide security services 225 including policing incoming and outgoing traffic (e.g., based on firewall policies) and identity verification for cloud consumers and tasks, as well as protection for data and other resources. The workloads layer 230 provides examples of functionality for which the cloud service provided may be utilized. Examples of workloads and functions which may be provided from this layer include but are not limited to: mapping and navigation 231, data analytics processing 232, transaction processing 233, software development 234, software management 235, and security software development 236.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

With reference to FIGS. 1 and 2, in one or more embodiments, management device 110 can be configured to manage one or aspects associated with operations performed by the service provider network 102. For example, in embodiments in which the service provider network 102 is or includes a cloud service provider, the management device 110 can facilitate various functionalities associated with the management abstraction layer 220 and the workload layer 230. In various exemplary embodiments, the management device 110 can include security management component 112 to facilitate security management associated with the service provider network 102. For example, the security management component 112 can perform security services (e.g., security services 225) and software security development (e.g., security software development 236) associated with network firewalls, such as user-defined firewall rules.

A "firewall" refers to a network security measure that controls incoming and outgoing network traffic based on a set of permit and deny rules or conditions, referred to herein as firewall policy rules. A network firewall can include hardware and software components depending on the type of network and/or parts of the network the firewall is designed to protect. Acting as a barrier between a trusted network (e.g., the service provider network 102) and other untrusted networks (e.g., the Internet), or less-trusted networks, a firewall controls access to the resources of the trusted network through a positive control model. This means that the only traffic allowed onto or off of the network is defined by the rules of the firewall policy; all other traffic is denied. Network firewalls can also separate different parts or subnetworks (subnets) of a network (e.g., parts of service provider network 102) that have different security requirements or risk profiles. For example, different physical or virtual machines or devices (e.g., the one or more server devices $104_{1-n}$, the one or more VMs $106_{1-n}$, the one or more data stores $108_{1-n}$, etc.), or communicatively coupled groups of the physical or virtual machines or devices, referred to herein as subnets, included in a network (e.g., the service provider network 102) can be associated with different security risk levels and thus have different firewalls that respectively control incoming and outgoing traffic. Such firewalls also work by enforcing firewall policy rules (e.g., a list of permit or deny conditions) on traffic flowing between the different physical or virtual machines, devices or subnets it connects.

The task of defining and maintaining network firewall policies has traditionally fallen to a security specialist or team of security specialists within the organization that owns or manages the network. In various existing networks, the network employs a formal request process which will allow security specialists of the network to add, modify, or remove different firewall policy rules associated with different machines/devices or sub-networks (or subnets) of the network. Each request is usually manually reviewed by one or more of the security specialists before being added to the firewall policy or rejected for some business or security-related reason.

The move towards cloud computing disrupts this traditional model by transferring much of the security responsibility directly to the owner, creator or manager of an application or service provided by the service provider network 102. For example, in various embodiments in which the service provider network 102 is or includes a cloud computing environment, the service provider network 102 can host, run and manage different software applications and other services for different users, companies or organizations at a remote location and make these software applications and services available to a plurality of other users via network (e.g., an internal network and/or one or more external networks 114). These applications and services can reside in physical or virtual machines, devices and/or subnets of the service provider network 102 (e.g., including the one or more server devices $104_{1-n}$, the one or more VMs $106_{1-n}$, the one or more data stores $108_{1-n}$, or combinations thereof) that can have resources added or removed on demand, instantiated, quiesced, and re-instantiated on other peer hardware. Firewall policies associated with such applications and services can define traffic authorized to enter and exit from the respective physical or virtual machines, devices and/or subnets at which the respective applications and services are deployed. For example, some firewall policies for services and applications deployed for a VM (e.g., the one or more VMs $106_{1-n}$) in a cloud computing environment can specify the type of traffic that is allowed to pass through a virtual network interface card (VNIC) or virtual interface card (VIC) that connects with the VM and/or a virtual subnet associated with the VM within the service provider network 102. This allows the owner to specify security policy that restricts traffic between virtual machines attached to the same virtual subnet, something that is not possible with a traditional firewall appliance in a physical deployment.

Many users that provide such services and applications for deployment on the service provider network 102 are not typically security experts, even if they have years of experience in the information technology, software engineering or data processing industries. This can easily lead an inexperienced user to misconfigure the firewall policies associated with their application or service, leaving their application or service and associated information vulnerable to a remote attacker.

In various embodiments, security management component 112 is configured to assess respective firewall policy rules associated with applications and services deployed on the service provider network 102 to determine a degree of risk associated with the respective firewall policy rules. The firewall policy rules associated with such applications and services can define traffic authorized to enter and exit from the respective physical or virtual machines, devices and/or subnets of the service provider network 102 at which the respective applications and services are deployed (e.g., the one or more server devices $104_{1-n}$, the one or more VMs $106_{1-n}$, the one or more data stores $108_{1-n}$, or subnets based on combinations thereof). This traffic for example can include traffic from sources within the service provider network 102 (e.g., other internal physical or virtual, machines, devices or subnets) as well as traffic external to the service provider network, such as traffic from one or more client devices $116_{1-n}$ and/or one or more remote sources $118_{1-n}$. In embodiments in which the service provider network 102 is a cloud service provider, the virtual machine, device or subnet at which such an application or service is deployed can be referred to as an "instance." Accordingly, the firewall policy rules associated with such an application or service can define traffic authorized to access or exit the instance. As used herein, the terms "virtual machine," "virtual instance" and "instance" are interchangeable and mean a software implementation/embodiment of a physical computer, device or machine or subnet of physical computers, devices, or machines. However, the subject techniques for assessing firewall rule policies are not limited to those associated with applications or services deployed on VMs in a cloud computing environment. Accordingly, various embodiments are described wherein the firewall policies define traffic authorized to access or exit from a machine or a subnet. In this context, the machine and the subnet can include physical and/or virtual machine/devices, including but not limited to, the one or more server devices $104_{1-n}$, the one or more VMs $106_{1-n}$, the one or more data stores $108_{1-n}$, or combinations thereof.

In one or more embodiments, the security management component 112 can be configured to receive firewall policy rules provided for a machine or subnet included in the service provider network 102 at which an application or service is deployed. For example, the firewall policy rules can be provided by a user that owns, created, manages, or otherwise has authority to control security settings for the application or service as deployed on the service provider network 102. In some implementations, the firewall policy rules can be received in association with a request to have the service provider network 102 (e.g., via the security management component 112) implement the firewall policy rules to control traffic allowed to access or exit the application or service.

The security management component 112 can further be configured to analyze the respective firewall policy rules to determine a degree of security risk associated with the respective firewall policy rules. For example, if a firewall policy rule defines traffic authorized to access the machine or subnet at which an application or service is deployed, the security management component 112 can be configured to determine a degree of risk associated with allowing such traffic to access the machine or subnet. The degree of security risk can account for a degree to which the firewall rule renders the machine or subnet vulnerable to access by unauthorized or unwanted traffic (e.g., traffic from other machines, systems, or subnets associated with hackers, viruses, worms, trojans, etc.). Likewise if a firewall policy rule defines traffic authorized to leave the machine or subnet at which an application or service is deployed, the security management component 112 can be configured to determine a degree of risk associated with allowing such traffic to leave the machine or subnet. The degree of security risk can account for a degree to which the firewall rule renders the traffic vulnerable to reception by unauthorized or unwanted entities (e.g., other machines, networks, subnets and associated users).

In various embodiments, the security management component 112 can be configured to evaluate the security risk associated with a firewall rule based on a function of degrees of security risk associated with individual variables or elements of the firewall rule. For example, a firewall rule for a machine (e.g., an instance) or subnet (e.g., a group of machines) can include several variables or elements, including but not limited to: a directionality of the traffic (e.g., ingress or egress), a remote address associated with the traffic (e.g., source of the traffic or destination of the traffic), and a type of the traffic, wherein the type of the traffic can include one or more protocols and one or more ports. For ease of explanation, the machine/device or subnet at which a service or application is deployed for which a firewall is provided is referred to herein as the "local" machine/device or subnet, and the machine/device, network or subnet associated with the remote end and remote address is referred to herein as the "remote" machine/device, network or subnet (even if it is also connected to the service provider network 102).

The directionality variable is a simple binary choice, ingress or egress. Ingress rules are applied to traffic as it traverses to the local machine or subnet (e.g., from a virtual network switch in to the instance's virtual network interface). Conversely, egress rules are applied to traffic as it traverses from the local machine or subnet (e.g., to the instance's virtual network interface out on to the virtual network switch). A single firewall rule is either an ingress rule or an egress rule, it cannot be both.

The remote address variable refers to the remote end (e.g., the remote machine/device or, system, or subnet) with which the local machine or subnet communicates (e.g., the local instance). In some implementations, the remote end can include sources within the service provider network 102 including other internal machines/devices or subnets. The remote end can also include sources external to the service provider network 102, such as remote machines/devices, networks, or subnets, which can include the one or more client devices $116_{1-n}$ and/or the one or more remote sources $118_{1-n}$. In some implementations, the remote address can specify a single IP address or a single classless inter-domain routing (CIDR) subnet (under the covers of a single IP address implemented as a CIDR subnet with a 32-bit mask). Multiple remote addresses are not supported. The solution to this limitation is to create multiple firewall rules, one for each discrete remote IP address. In another implementation, the remote address can specify a security group name of a known group of remote machines (i.e., a network or subnet) associated with the same IP address or CIDR (e.g., an OpenStack™ security group). In this scenario the remote address variable is interpreted to include all machines (e.g., VMs) which have that group name applied to their VNIC or NIC. The security management component 112 can further have access to information that identifies the IP addresses for the machines respectively associated with the same group name and VNIC, the number of remote machines associated with the security group name, and/or a predetermined security risk value associated with the security group name.

The destination of an ingress rule or the source of an egress rule is the address (e.g., IP address) for the local machine or subnet for which the firewall rule is provided. In various embodiments, the IP address for the local machine or subnet is provided by the user providing the firewall rule. In other embodiments, the IP address for the local machine or subnet can be determined by the security management component 112 based on information provided with the firewall rule identifying the service or application to be protected by the firewall rule. Still in other embodiments, the local machine or subnet can be identified by a single classless inter-domain routing (CIDR) subnet IP address or a security group name provided by the user that provides the firewall rule or determined by the security management component 112 based on information provided with the firewall rule identifying the service or application to be protected by the firewall rule.

The traffic type variable can include an IP protocol and port or port range. As with the remote address variable, a firewall rule can specify exactly one type of traffic (e.g., protocol and port combination). The solution for multiple traffic types is to specify a port range (if appropriate) or to create multiple firewall rules, one for each traffic type. In some embodiments, IP protocol and port or port range can be treated as separate firewall rule variables or elements.

Figure 3:
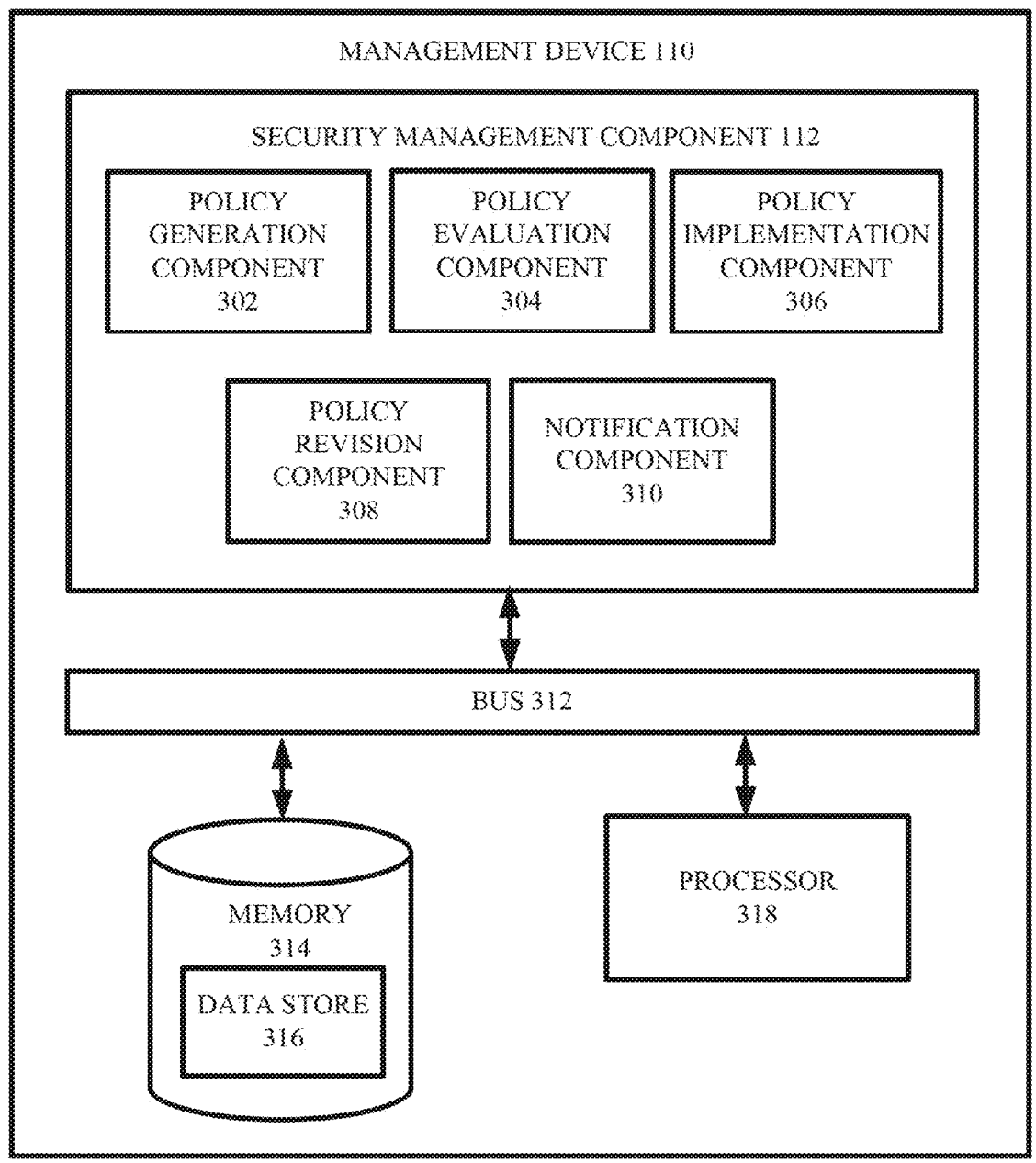
FIG. 3 illustrates an example block diagram of a management device in accordance with one or more embodiments described herein.

In one or more embodiments, for each variable or element included in firewall rule, the security management component 112 can determine a security risk value or score representative of an amount of security risk associated with the variable using the various techniques described herein with reference to FIG. 3. The security management component 112 can further determine a total security risk value or score associated with the firewall rule based on a result of a combination of the security risk values determined for each variable.

The security management component 112 can further be configured to police implementation of the respective firewall rules. For example, in one embodiment, in response to a determination that a firewall policy rule is associated with an acceptable degree of risk (e.g., with respect to a defined threshold total security risk value), the security management component 112 can be configured to implement the firewall policy rule. For example, the security management component 112 can control traffic to and from the machine or group of machines (i.e., subnet) in accordance with the firewall policy rule. In another embodiment, in response to a determination that a firewall policy rule is not associated with an acceptable degree of risk, the security management component 112 can reject the firewall policy rule. The security management component 112 can also notify the user/administrator that provided the rule regarding the rejection of the rule. In some implementations, the security management component 112 can further suggest a modification to the firewall policy rule that will bring the firewall policy rule within an acceptable degree of risk. In other implementations, the security management component can send the rejected firewall policy rule to another system for additional review (e.g., by a security specialist).

One major technical benefit of the subject security management component 112 lies in reducing the incidences whereby a user/administrator inexperienced in information technology security can misconfigure the security controls for their applications or services deployed on the service provider network 102, thus leaving them open to attack by some bad actor on the network. From an end-user perspective, the benefit of the solution is its real-time nature. For example, a user providing a potential firewall policy rule can receive immediate feedback regarding the degree of security risk associated with the potential firewall rule. As a result, the subject firewall policy evaluation techniques can also be applied to applications and services deployed in cloud computing environments (e.g., service provider network 102), where new assets are created and destroyed at need in response to changing load on the system. In this case the primary objective is to protect against programmer error or misconfiguration by responding to the calling program with a clear message that notifies the programmer regarding a firewall policy rule associated with high security-risk. The commercial benefit of the subject security management component 112 is that an organization's security specialists can configure the system once, but then benefit each time a user makes a new firewall rule request. This helps the security team fulfill their essential governance role, while freeing them from the mundane take of accepting and processing every end-user request, allowing them to concentrate on setting direction and security policy.

Although the management device 110 is depicted as a standalone device within the service provider network 102, it should be appreciated that the management device 110 or features and functionalities of the management device 110, (e.g., security management component 112 or features and functionalities of security management component 112), can be located on or within another device included in the service provider network 102 (e.g., a server device of the one or more server devices $104_{1-n}$, a VM of the one or more VMs $106_{1-n}$, a data store of the one or more data stores $108_{1-n}$, etc.). Likewise, one or more features and functionalities of the management device 110 and/or the security management component 112 can be distributed across a plurality of devices included in the service provider network 102. Further, the management device 110, the security management component 112, and/or features and functionalities of the management device 110 and the security management component 112 can be associated with a real or virtual machine or device included in the service provider network 102.

Referring now to FIG. 3, presented is an example block diagram of a management device (e.g., management device 110) in accordance with one or more embodiments described herein. Repetitive description of like elements employed in other embodiments described herein is omitted for sake of brevity.

Management device 110 can include security management component 112 which can include various components that facilitate evaluating and implementing firewall policies in accordance with various aspects and embodiments describe herein, including but not limited to: policy generation component 302, policy evaluation component 304, policy implementation component 306, policy revision component 308 and notification component 310. The management device 110 can also include, (or access at another device or machine of the service provider network 102), memory 314 configured to store computer executable components and instructions and processor 318 configured to facilitate operation of the instructions (e.g., computer executable components and instructions) by the management device 110. In various embodiments, one or more of the security management component 112, the various components of the security management component 112, the memory 314 and the processor 318 can be electrically and/or communicatively coupled to one another to perform one or more functions of management device 110. The management device 110 can also include a bus 312 that couples the various components of the management device 110, including, but not limited to, the security management component 112 and the various components of the security management component 112, the memory 314 and the processor 318.

In various embodiments, the memory 314 can store firewall policy information associated with different physical or virtual machines devices, or subnets of the service provider network 102. The memory 314 can also store information that facilitates evaluating the firewall policy rules, such as processing functions that define one or more mechanisms to determine a degree of security risk associated with respective firewall policy rules. The processor 318 can perform one or more of the functions described herein with reference to the management device 110 and the security management component 112. For example, the functions can include, but are not limited to, those for which machine-readable storage media is provided via memory 314. As such, data storage 316 can store information for use by the memory 314 and processor 318 including, but not limited to, information relating known security risk values associated with different known traffic elements, including but not limited to, known remote addresses (e.g., including IP addresses, CIDR subnet IP addresses, and security group names), and known types of traffic, which can include one or more protocols associated with the traffic and one or more ports associated with the traffic.

With reference to FIGS. 1, 2 and 3, the policy generation component 302 can be configured to facilitate users with generating firewall policy rules for their applications or services deployed on the service provider network 102 (e.g., via one or more of the one or more server devices $104_{1-n}$, the one or more VMs $106_{1-n}$, the one or more data stores $108_{1-n}$, or combinations thereof). For example, a user that created, owns, manages, or otherwise has authority to control security measures associated with a service or application deployed on the service provider network 102 can interface with the service provider network 102 (e.g., via the user portal 223) and employ the policy generation component 302 to generate a firewall policy rule for the service or application. For example, the policy generation component 302 can receive user input selecting a particular, application or service and/or the local machine or subnet at which the application or service is deployed. In some implementations, the user input can include the IP address, CIDR or security group name associated with the local machine or group of local machines. In other implementations, the policy generation component 302 can determine the IP address, CIDR or security group name associated with the local machine or group of machine based on user the user input information identifying the application or service to be controlled by the firewall rule and information stored in a data store (e.g., data store 316) identifying IP addresses, CIDRs or security group names respectively associated with the different applications and/or services deployed on the service provider network 102.

The policy generation component 302 can also receive user input information (e.g., via the user portal 223) defining one or more variables of the firewall policy rule, including by not limited to: a directionality of the traffic (e.g., ingress or egress), a remote address associated the traffic (e.g., a remote IP address, a CIDR or a security group name), and a type of the traffic, wherein the type of the traffic can include one or more protocols and one or more ports. For example, with respect to the remote address variable, in some implementations, the policy generation component 302 can receive the remote IP address or CIDR subnet address associated with a remote machine or group of machines (e.g., a remote network or subnet) that the local machine or subnet can receive traffic from (i.e., for an ingress rule) or send traffic to (i.e., for an egress rule). In other implementations, the policy generation component 302 can receive information from which the remote IP address of the remote machine, network or subnet can be determined (e.g., by the policy generation component 302 or the policy evaluation component 304), such as a security group name. According to this implementation, the policy generation component 302 or the policy evaluation component 304 can be configured to access information in a data store (e.g., data store 316) that identifies an IP address or CIDR subnet address associated with the security group name, and/or a number of remote machines associated with the security group name. With respect to the traffic type variable, the policy generation component 302 can receive information identifying a protocol associated with the traffic and a port or port range associated with the traffic.

In some embodiments, received user input identifying an application or service (or instance of the application or service) and defining parameters of a firewall policy rule for the application or service can be associated with a request for the service provider network 102 to implement the firewall policy rule. In various implementations, if the policy generation component does not receive input for a particular variable of the firewall policy rule, the policy generation component 302 can apply a default value for that variable. For example, the default value can include a value associated with a known low degree of security risk. For instance, the default remote IP address can correspond to an internal subnet within the service provider network 102 and associated with the service or application. In another example, the default traffic type can include encrypted HTTP (i.e., HTTPS).

The policy evaluation component 304 can be configured to evaluate a firewall policy rule to determine a degree of security risk associated therewith. In one or more embodiments, for each variable included in a firewall rule, the policy evaluation component 304 can determine a security risk value or score representative of an amount of security risk associated with the variable. The policy evaluation component 304 can further determine a total security risk value or score associated with the firewall rule based on a result of a combination of the security risk values determined for each variable. The policy evaluation component 304 can further compare the total security risk value or score with one or more threshold values to determine whether the degree of security risk associated with the firewall rule is acceptable or not and/or whether the firewall rule needs additional review (e.g., by a security specialist) prior to rejecting or implementing the rule.

In some embodiments, the policy evaluation component 304 can be configured to evaluate inbound (ingress) and outbound (egress) firewall rules separately. By limiting evaluation of inbound and outbound firewall rules separately, in some implementations each firewall rule can be considered a 2-tuple rule; a rule which specifies 2 variables, the remote address and the traffic type. In one or more embodiments, the policy evaluation component 304 can determine a security risk value or score for each variable with respect to an arbitrary defined scale (e.g., from 0 (low) to 1 (high)). For example, the security risk value associated with the remote address, referred to herein as the remote address risk value, can be considered x, and the security risk value associated with the traffic type, referred to herein as the traffic type risk value, can be considered y.

In various embodiments, the policy evaluation component 304 can then apply a function that outputs a value representative of the combined security risk associated with each variable x and y. For example, in some implementations, the policy evaluation component 304 can employ vector calculus to determine the distance between the point (x, y) and the origin (0, 0) with respect to a 2-dimensional coordinate space. According to this example, the total level of risk associated with the firewall rule is proportional to the magnitude or length of the vector from (0,0) to (x, y) in the 2-dimensional space, wherein the greater the magnitude or length the higher the risk. This model can further be applied to higher dimensions to evaluate firewall rules based on additional firewall rule variables (e.g., 3 variables, 4 variables, 5 variables, etc.). For example, in some embodiments, the policy evaluation component 304 can treat the traffic type variable as two separate variables, traffic protocol and traffic port or port range. According to these embodiments, an ingress or egress firewall rule will have 3 variables, remote address, traffic protocol and traffic port, and thus be 3-tuple in nature. The policy evaluation component 304 can determine security risk values respectively associated with each of the 3 variables, identified as x, y, and z, with respect to an arbitrary fixed scale. Then, using the same principles of vector calculus, the policy evaluation component 304 can calculate the distance from point (0,0,0,) to (x,y,z) in 3-dimensional coordinate space to determine the level of risk for such a 3-tuple rule. Likewise, assuming a firewall rule has 4 variables and thus is 4-tuple in nature, the policy evaluation component 304 can determine security risk values respectively associated with each of the 4 variables, identified as w, x, y, and z, with respect to an arbitrary fixed scale. Again, using the same principles of vector calculus, the policy evaluation component 304 can calculate the distance from point (0,0,0,0) to (w,x,y,z) in 4-dimensional space to determine the level of risk for such a 4-tuple rule.

The mechanisms for determining the security risk values associated with each variable of a firewall rule can vary based on the type of the service provider network 102 (e.g., a public cloud, a private cloud, a community cloud, a hybrid cloud, etc.), and the security risk tolerances of the entity associated with ownership of the asset or application that a firewall rule is designed to protect. In some implementations, the mechanisms for determining the security risk values associated with each variable of a firewall rule can also vary based the security profile of the particular asset being protected (e.g., the particular application or service deployed on a machine or subnet of the service provider network 102).

In various embodiments, remote address risk value can be based on the number of remote machines associated with the remote address variable. In particular, security risk increases proportionally with the number of remote machines or devices from which the local machine or subnet can receive traffic from or send traffic to. In some implementations, the remote address variable represents a single remote machine or device associated with a single remote IP address. In this scenario, the amount of security risk associated with the remote address (e.g., the remote address risk value) is low. However, the remote address can also represent a group of remote machines or devices (e.g., a network or subnet) respectively associated with a CIDR subnet or security group name (e.g., an OpenStack™ security group name). For example, a CIDR subnet can be associated with a single IP address yet implemented as a subnet IP address with a 32 bit-number mask. A security group name can be interpreted to include all machines (e.g., VMs) which have that group name applied to their VNIC or NIC. In some embodiments in which the remote address variable includes a security group name, the policy evaluation component 304 can access to information that identifies the IP addresses for the machines respectively associated with the same group name and VNIC, and/or the number of remote machines associated with the security group name. The number of remote machines associated with a CIDR subnet or security group name can vary.

Figure 4:
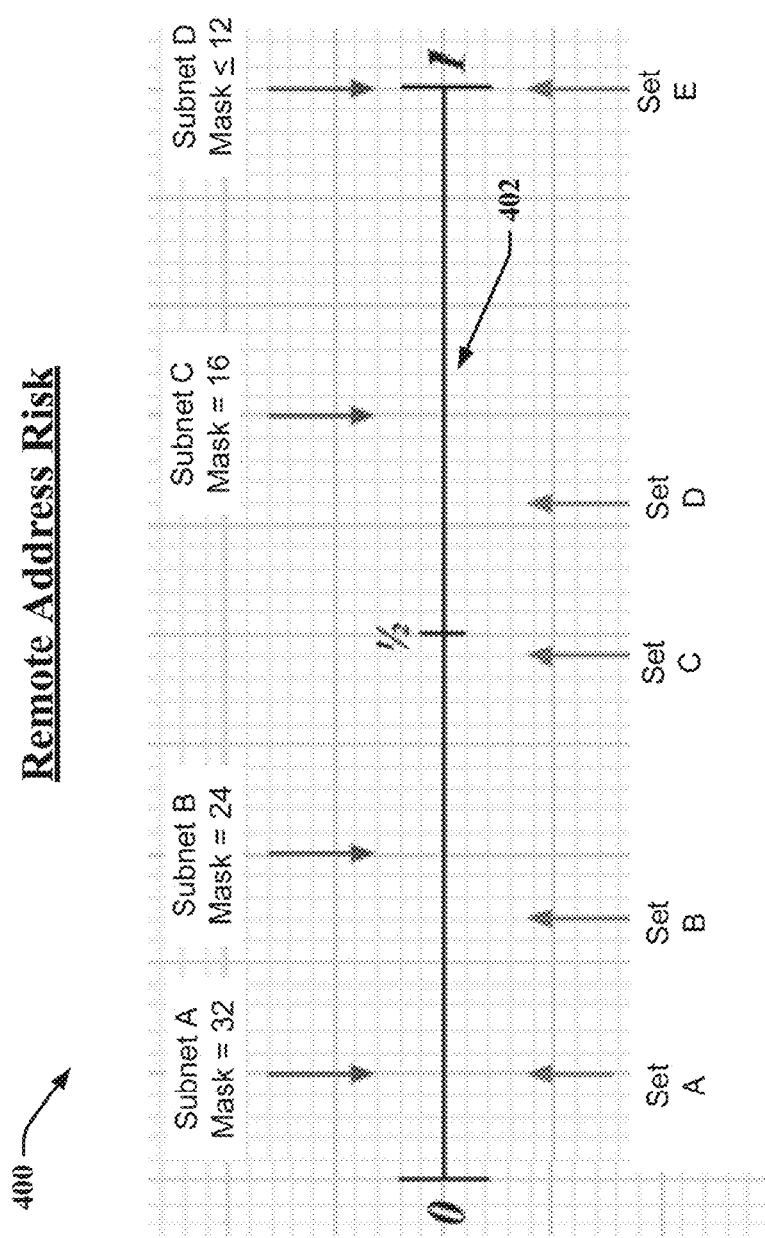
FIG. 4 presents an example graph identifying possible remote address risk values for different remote address variables respectively associated with different firewall rules.

For example, FIG. 4 presents an example graph 400 identifying possible remote address risk values for different remote address variables respectively associated with different firewall rules. These variables include arbitrary CIDR subnets (e.g., subnet A, subnet B, subnet C and subnet D), and sets of machines (e.g., Set A, Set B, Set C, Set D and Set E), for which some information regarding a degree of security risk associated therewith, has been previously determined. Repetitive description of like elements employed in respective embodiments is omitted for sake of brevity.

Graph 400 includes an arbitrary remote address risk scale represented by line 402, wherein the lowest amount of risk is assigned a value of zero and the highest amount of risk is assigned a value of 1. The degree of security risk associated with a particular remote address variable corresponds to where it falls between zero and one along line 402 of the graph 400. It should be appreciated that the scale of from zero to one is arbitrary and that other scalar values may be used (e.g., one to 10, one to 100, etc.).

The subnets A, B, C and D are considered arbitrary because the only information known about the respective arbitrary CIDR subnets is their size. Each of the subnets A-D provided above line 402 correspond to different subnets having different mask lengths and thus different remote set sizes (e.g., wherein remote set size refers to the number of machines included in the subnet). In this case, a shorter mask length corresponds to a larger remote set or group of remote machines/devices that are able to communicate with the local machine or instance. The size of the remote set grows exponentially as the mask-length shrinks. The larger the size of the remote set, the higher the remote address security risk associated therewith. In the example shown, the remote address risk value associated with the subnets A-D having different mask lengths is calculated based on the following formula, wherein x is the CIDR mask length in bits:

$$\text{risk} = \min(1, 0.7^{(x-12)/4})$$

The resulting risk value of the above formula is the risk score represented by the possible risk scores on line 402 (i.e., between 0 and 1). For example, as shown in graph 400, a first arbitrary CIDR subnet A with a mask of 32 is associated with the lowest remote address risk value (i.e., about 0.1). In one implementation the number of machines included in the remote set for the arbitrary CIDR subnet A with a mask of 32 can be 1. A second arbitrary CIDR subnet B with a mask of 24 is associated with a remote address risk value of about 0.3. In one implementation, the number of machines included in the remote set for the second arbitrary CIDR subnet B can be 256. A third arbitrary CIDR subnet C with a mask of 16 is associated with a remote address risk value of about 0.6. In one implementation, the number of machines included in the remote set for the third arbitrary CIDR subnet C can be 65536. A fourth arbitrary CIDR subnet D with a mask of less than or equal to 12 is associated with a remote address risk value of about 1.0 (i.e., the highest remote address risk value). In one implementation, the number of machines included in the remote set for the fourth arbitrary CIDR subnet is between $2^{20}$ and $2^{32}$, and so on. Accordingly, in various embodiments, different sizes of remote sets and/or different mask lengths can be pre-associated with different remote address risk values, wherein the risk values increase as the size of the remote set increases. It should be appreciated that the above formula and scoring scale are merely exemplary and a variety of possible scales and associated scoring functions can be employed to evaluate risk.

With reference to FIGS. 1 and 3, in addition to remote set size, in some embodiments, the remote address security risk value can be based on known information regarding a degree of security risk associated with the remote address variable. In particular, the security management component 112 can have some knowledge regarding levels of security risk associated with certain IP addresses, CIDR subnets and security groups. According to these embodiments, the policy evaluation component 304 can access a remote address security risk data store (e.g., data store 316) or similar databases, that includes information identifying various known remote address variables (e.g., known IP address, know CIDRs, or known security groups) and pre-defined remote address risk scores respectively associated with the known remote address variables. These remote address risk values can vary depending on the subjective perspective of the organization or organizations employing the subject security management component 112 to evaluate the internal firewall policies of the service provider network. The policy evaluation component 304 can thus determine the remote address risk value for some firewall rule remote address variables when the remote address variables are included in the remote address risk data store or a similar database.

For example, the organization or organizations that provide the service provider network 102 can develop and/or access a database including a list of known very bad remote sources (e.g., known malicious entities) included in the one or more remote sources $118_{1-n}$ that may attempt to access the security provider network 102 (e.g., via the one or more networks, such as the Internet). This list can be considered a "blacklist" such that any remote source included on the blacklist is associated with the highest possible remote address risk value and thus never allowed to communicate with any machine, device or subnet of the service provider network 102. This blacklist can be adapted over time to remove or add remote sources as appropriate. Likewise, the organization or organizations that provide the service provider network 102 can develop and/or access a database including a list of known "very good" remote sources included in the one or more remote sources $118_{1-n}$ that may attempt to access the security provider network 102 (e.g., via the one or more networks, such as the Internet). This list can be considered a "whitelist" such that any remote source included on the whitelist is associated with the lowest possible remote address risk value and thus allowed to communicate with any machine, device or subnet of the service provider network 102. Information can also be included in the remote address risk data store (or a similar data store) identifying various additional known remote sources $118_{1-n}$ may be pre-associated with varying degrees of remote risk between the lowest possible risk value and the highest possible risk value.

Furthermore, in various embodiments, the policy evaluation component 304 can be configured to identify an IP address, CIDR subnet or security group that is internal to the service provider network 102 using information provided in a data store (e.g., data store 316) that identifies IP addresses, CIDR subnets and security groups that are internal to the service provider network 102. Such an internal remote address can be considered a lower security risk relative to remote addresses that are external to the service provider network. For example, in some embodiments, the policy evaluation component 304 can apply a defined (low) remote address security risk value for all remote addresses included within the service provider network 102. In other embodiments, different machines or subnets of the service provider network 102 can be associated with different security risk levels. According to these embodiments, the different machines or subnets of the service provider network 102 can be pre-associated with defined remote address risk values that account for their respective security risk levels. For example, data store 316 (e.g., or another data store accessible to the policy evaluation component 304) can include information that identifies particular remote address risk value that have been pre-associated with the different machines, subnets or security groups of the service provider network. Thus in some embodiments, the policy evaluation component 304 can look-up the remote address risk value associated with a remote address variable that includes an internal IP address, subnet or security group. Still in other embodiments, the policy evaluation component 304 can determine if a remote address variable is associated with the same security group or subnet as the local machine, and/or the same service or application for which the firewall rule is being provided (known as intra-tenant traffic). According to these embodiments, the policy evaluation component 304 can be configured to apply a very low (pre-defined) remote address risk value if the remote address variable is associated with the same security group or subnet as the local machine, and/or the same service or application for which the firewall rule is being provided.

With reference again to FIG. 4 each of the Sets provided below line 402 of graph 400 (e.g., Set A, Set B, Set C, Set D and Set E), correspond to example remote address variables identified in a firewall rule. The respective Sets A-E can include a group or Set of machines (e.g., including one or more machines) for which some knowledge regarding a degree of security risk associated therewith has been previously determined. The respective Sets A-E can represent a single machine and a single IP address for the machine, a group of machines included in a CIDR subnet, or a group of machines associated with a same network, or group of machines associated with a same security group name. For example, the Set A associated with the lowest remote address risk value (e.g., about 0.1) may include a group of internal machines (e.g., internal to the service provider network 102) associated with the same security group name as the local machine and thus associated with the same service or application for which the firewall rule is being provided. In another example, the Set B associated with the second lowest remote address risk value (e.g., about 0.22) may include a group of internal machines (e.g., internal to the service provider network 102) associated with the same CIDR subnet as the local machine for which the firewall rule is being provided. In another example, the Set E associated with the highest remote address risk value (e.g., about 1.0) may include an IP address or a CIDR subnet for a remote machine or group of remote machines that are included on the blacklist. Further, the sets the Set C and D may include an IP address or a CIDR subnet for a remote machine or group of remote machines that are identified in a remote address risk database as being having remote risk values of about 0.48 and 0.62, respectively.

In some embodiments, the remote address risk value can balance the size of the remote set and knowledge regarding a remote risk value associated with the remote address variable. According to these embodiments, the policy evaluation component 304 can be configured to identify remote address variables that are associated with a known entity (e.g., a remote network or subnet) having a known remote address risk value associated therewith. The policy evaluation component 304 can further increase or decrease that remote address risk value based on the size of the remote set. For example, the policy evaluation component 304 can be configured to increase the remote address risk value by a value n (e.g., where n can be a number or percentage) based on the remote set being greater than a first threshold value and decrease the remote risk value by a value m (e.g., where n can be a number or percentage) based on the remote set being lower than a second threshold value.

With reference back to FIGS. 1 and 3, the policy evaluation component 304 can employ similar techniques to determine a degree of security risk associated with the traffic type variable, the traffic type risk value. The traffic type variable specifies the set of protocols which are allowed into or out of to the local machine or subnet. For example, the traffic type variable can specify a protocol and port or port range. Although the maximum size of this set is substantially smaller than the potential maximum size of the remote address set, in many ways it is harder to evaluate relative to the remote address variable because a majority of TCP and UDP ports are not allocated to a single well-known service.

In various embodiments, known protocol-port combinations for which traffic type risk values can be previously determined are defined in a data store (e.g., data store 316) accessible to the policy evaluation component 304. In particular, well known services can be assigned pre-defined traffic type risk values that account for a subjective level of security concern associated with allowing the type of traffic into or out of a local machine or subnet of the service provider network. Protocol-port combinations that are not included in the data store can be associated with an arbitrary but high traffic type score based on the assumption that the service provider network 102 does not know anything about the traffic. In an aspect, an encrypted traffic type can be associated with a lower traffic type value relative to non-encrypted traffic. In various additional embodiments when the service provider network does not have information associating a known traffic type risk value with a particular traffic type provided in a firewall rule, the traffic type risk value can increase as the number of protocol-port combinations increases. For example, the policy evaluation component 304 can be configured to assign a first low traffic type risk value to traffic associated with less than x (e.g., 50) protocol-port combinations, a second medium traffic type risk value to traffic associated with between x and y (e.g., 50 and 100) protocol-port combinations, and a third high traffic type risk value for traffic having more than y protocol-port combinations.

Figure 5:
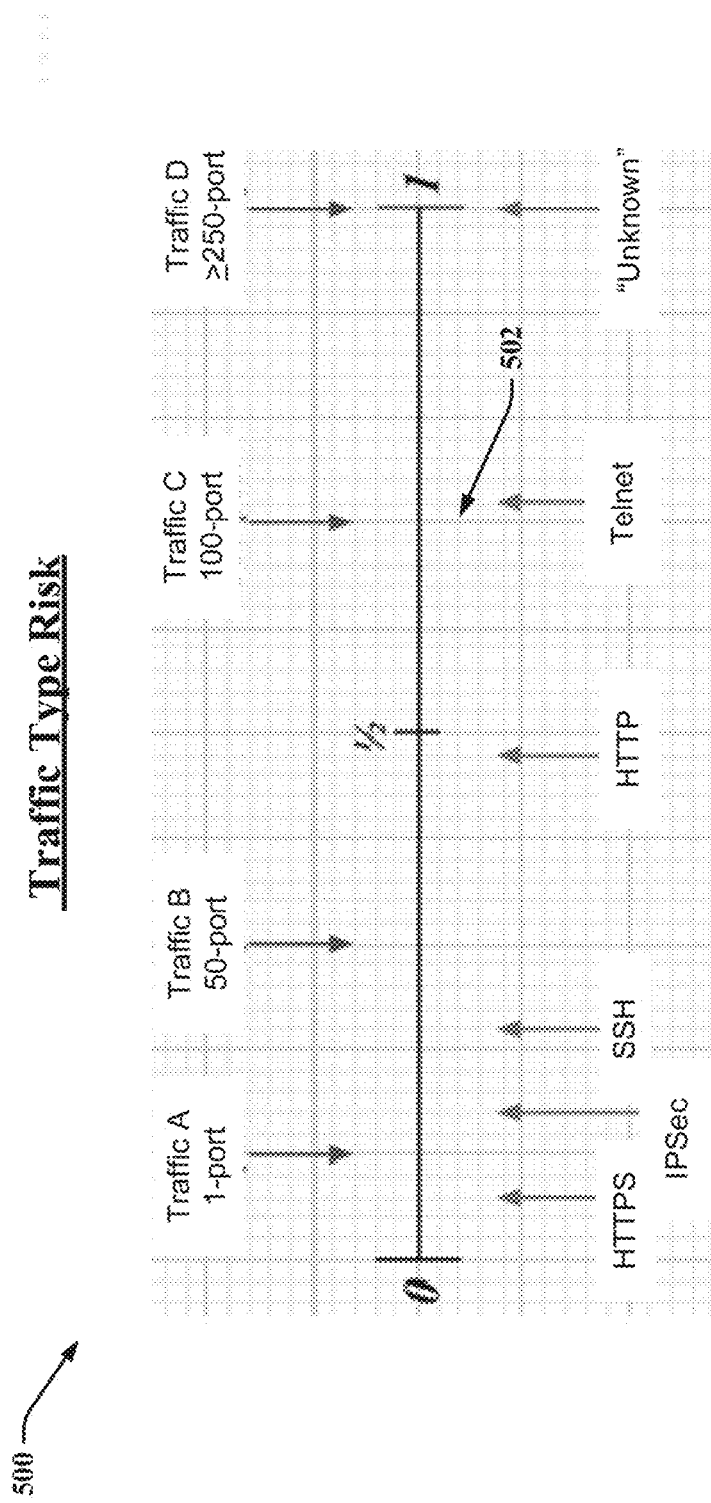
FIG. 5 presents an example graph identifying possible traffic type risk values for different traffic type variables respectively associated with different firewall rules.

For example, FIG. 5 presents an example graph 500 identifying possible traffic type risk values for different traffic type variables respectively associated with different firewall rules. These various arbitrary traffic types (e.g., Traffic A, Traffic B, Traffic C, and Traffic D) for which only a number of protocol-port combinations can be determined, and some known traffic types that have been previously associated with information identifying a defined traffic type risk value. Repetitive description of like elements employed in respective embodiments is omitted for sake of brevity.

Like graph 400, graph 500 includes an arbitrary traffic type risk scale represented by line 502, wherein the lowest amount of risk is assigned a value of zero and the highest amount of risk is assigned a value of 1. The degree of security risk associated with a particular traffic type variable corresponds to where it falls between zero and one along line 502 of the graph 500. It should be appreciated that the scale of from zero to one is arbitrary and that other scalar values may be used (e.g., one to 10, one to 100, etc.). In various embodiments, the same risk scale is employed for evaluating remote address risk and traffic type risk. As shown in graph 500, an arbitrary traffic type associated with only one port can be associated with a low traffic type risk value (e.g., about 0.1). As the number of ports increases, the traffic type risk value linearly increases. Also as shown in graph 500, below line 502 are various known traffic types, including HTTPS, IPSec, SSH, HTTP, and Telnet. These traffic types are respectively associated with known traffic type risk values, with HTTPS having the lowest traffic type risk value and Telnet having the highest traffic type risk value. In addition, in some embodiments, traffic that is considered of an unknown type can be associated with the highest possible risk value (e.g., 1.0).

With reference again to FIGS. 1 and 3, the policy evaluation component 304 can further be configured to determine a total amount of security risk associated with a firewall rule based on a result of a combination of the determined remote address risk value and the traffic type risk value. For example, in some implementations, the total risk value associated with a firewall rule can be based on a summation of the respective risk values. In another implementation, the total risk value can be based on an average risk value of the respective risk values.

Still in other implementations, the policy evaluation component 304 can associate the remote address risk value with a coordinate x, and the traffic type risk value with a coordinate y of a 2-dimensional Cartesian coordinate space. The policy evaluation component 304 can further be configured to employ vector calculus to determine the distance between the point (x, y) and the origin (0, 0) with respect to a 2-dimensional coordinate space. According to this example, the total level of risk associated with the firewall rule is proportional to the magnitude or length of the vector from (0,0) to (x, y) in the 2-dimensional space, wherein the greater the magnitude or length the higher the risk.

Figure 6:
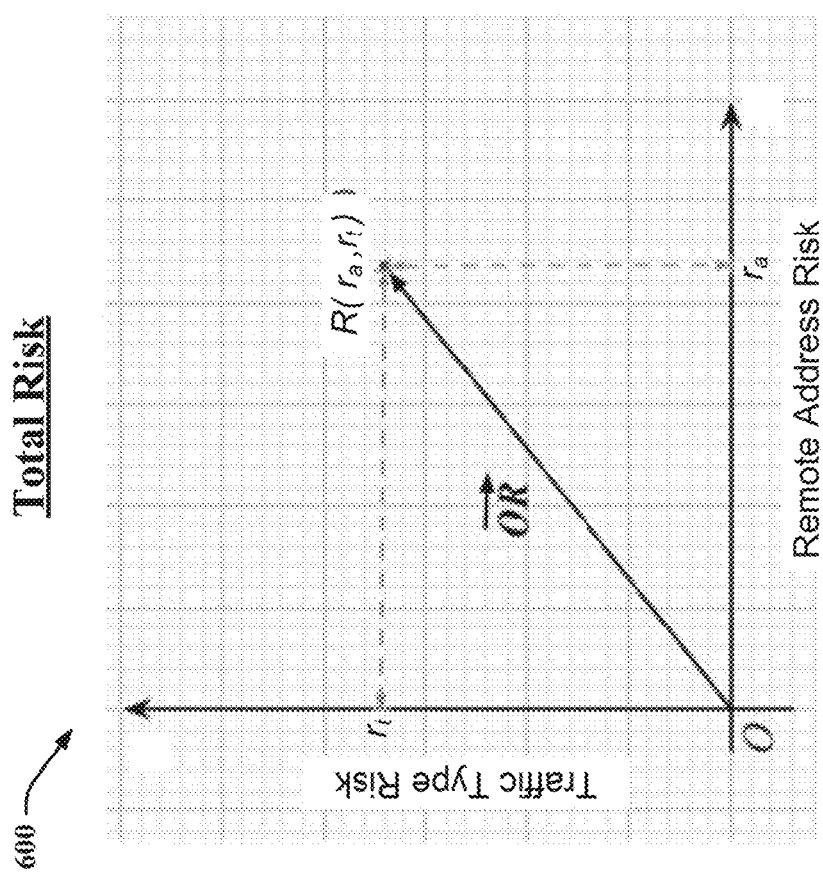
FIG. 6 presents a graphical representation of a total risk value determined based on the magnitude of a vector determined based on a function of a first remote address risk value and a second traffic type risk value.

For example, FIG. 6 presents a graphical representation 600 of a total risk value determined based on the magnitude of a vector determined based on a function of a first remote address risk value ($r_a$) and a second traffic type risk value ($r_t$). The graphical representation 600 includes a 2-dimensional Cartesian coordinate space including a horizontal x-axis corresponding to remote address risk ($r_a$), and a vertical y-axis corresponding to traffic type risk ($r_t$). The plotted point R, corresponds to ($r_a$, $r_t$). The length or magnitude of the line $\overrightarrow{OR}$ from the origin 0 to point R corresponds to the total risk value associated with the firewall rule. According to this technique, the greater the magnitude of the vector $\overrightarrow{OR}$, the greater the potential security risk of the firewall rule. Since the axes of the Cartesian plane are orthogonal, the magnitude of the risk vector $\overrightarrow{OR}$ can be calculated using Pythagoras's theorem (that is, $\|\overrightarrow{OR}\| = \sqrt{r_a^2 + r_t^2}$).

With reference back to FIGS. 1 and 3, in various embodiments, the policy evaluation component 304 is further configured to compare a total risk value determined for a firewall rule with one or more thresholds to determine whether the rule is associated with an acceptable amount of security risk. For example, in some implementations, the policy evaluation component 304 can compare the total risk value determined for a firewall rule with a threshold risk value. If the total risk value is less than the threshold risk value, in some implementations, the policy evaluation component 304 can direct the policy implementation component 306 to implement the rule to control traffic to or from (depending on whether the rule is an ingress or egress rule) the local machine or subnet for which the rule is associated. In particular, the policy implementation component 306 can direct a network device of the service provider network 102 (e.g., a physical or virtual machine/device) that connects to the local machine or subnet and controls the traffic that enters and leaves the local machine or subnet to control the traffic that enters and leaves the local machine or subnet based on the firewall policy rule. For example, in embodiments in which the service or application associated with the firewall rule is deployed on or is associated with a virtual subnet of the service provider network 102, the policy implementation component 306 can cause the VNIC that connects to the virtual subnet or machine to pass through the VNIC based on the firewall rule. In other embodiments, the policy implementation component 306 can direct a physical router or virtual router of the service provider network 102 that connects to the local machine or subnet to control traffic that enters and leaves the local machine or subnet base on the firewall policy rule. Similarly, if the total risk value is greater than the threshold risk value, the policy evaluation component 304 can reject the firewall rule. In some implementations when a rule is rejected, the policy implementation component 306 can further continue to control traffic to and from the virtual asset (e.g., the local machine or subnet) based on a previously implemented firewall policy (e.g., or default firewall policy).

In some embodiments, rather than automatically rejecting or accepting a firewall policy rule based on comparison to a threshold risk value, the policy evaluation component 304 can be configured to forward a rule that has a total risk value above or near (e.g., with respect to a threshold degree of deviation) a maximum threshold risk value to the policy revision component 308. In some implementations, the policy revision component 308 can be configured to further analyze a firewall rule to determine a variable or characteristic of the variable (e.g., port range) that is responsible the rule having a high or relatively high total risk value. For example, a particular rule may have a low remote address risk value but have a relatively high traffic type value, and vice versa. The policy revision component 308 can further determine a mechanism to lower the total risk value associated with a proposed firewall rule to bring the rule within compliance of an acceptable security risk level. For example, the policy revision component 308 can identify a variable or characteristic of the variable (e.g., port range) of a firewall rule that has the greatest impact on the severity of the total risk value. The policy revision component 308 can further suggest a modification to this variable or characteristic of the variable to reduce the total risk value (e.g., decrease the port range). In other implementations, the policy revision component 308 can be configured to provide rules that are above or near a maximum threshold risk value to be reviewed in greater detail by a security specialist or another system.

The notification component 310 can be configured to generate and send a notification to a user or user identity associated with providing a firewall rule for evaluation by the security management component 112 regarding acceptance or rejection of the firewall rule. For example, the notification component 310 can be configured to notify a user identity associated with ownership of the local machine or subnet associated with the firewall policy rule that the firewall policy rule is not associated with the acceptable degree of security risk. In implementations in which the firewall rule is rejected, the notification can include information identifying the variable of the rule having the strongest impact on the severity of the total risk score of the rule. The notification can also include information identifying a suggested modification of the rule.

Figure 7:
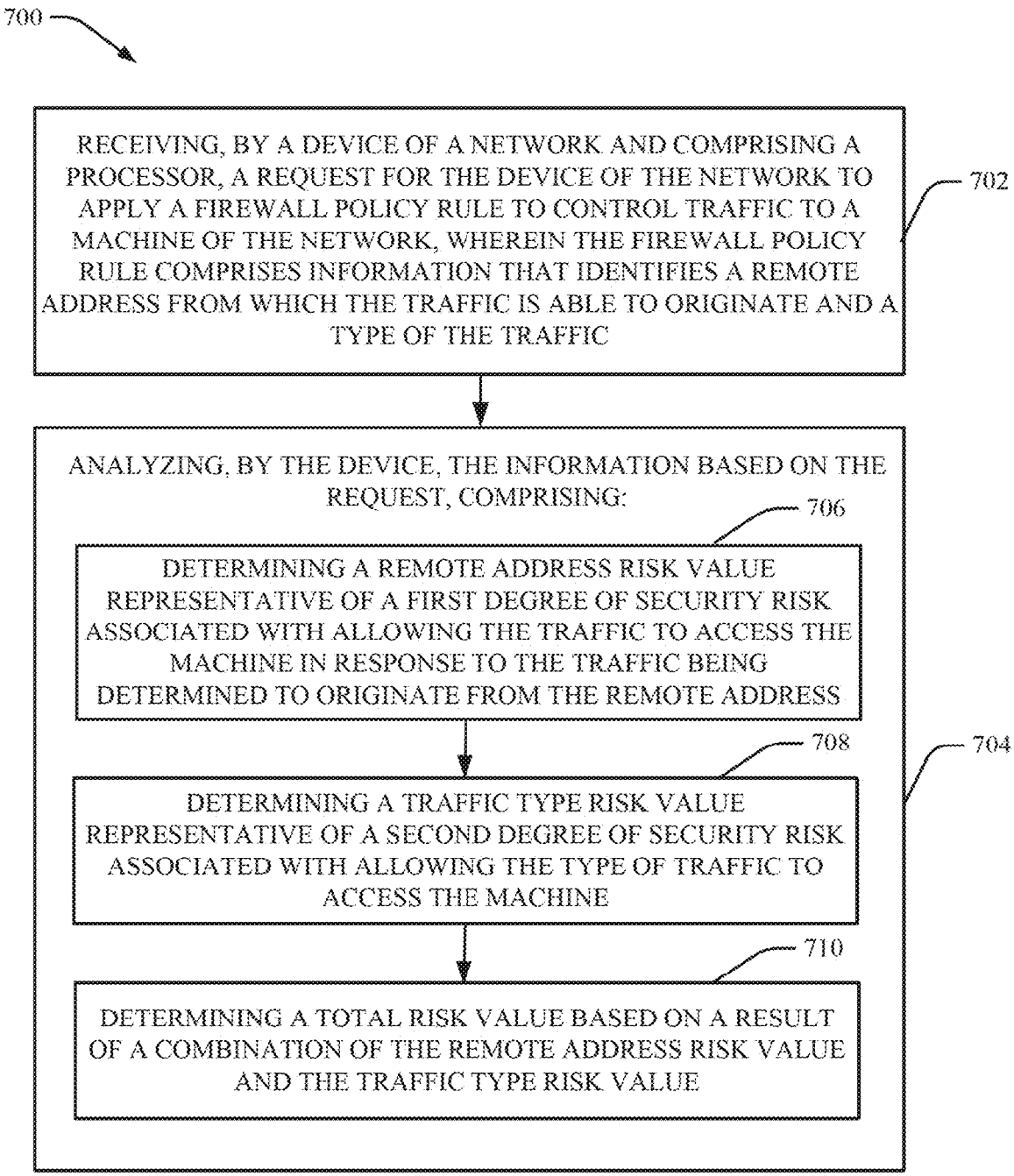

FIGS. 7-9 illustrate flow diagrams of example, non-limiting methods that facilitate telemetry data communication security between an implantable device and an external device in accordance with one or more embodiments described herein. While, for purposes of simplicity of explanation, the methodologies are shown and described as a series of acts, the disclosed subject matter is not limited by the order of acts, as some acts can occur in different orders and/or concurrently with other acts from that shown and described herein. For example, those skilled in the art will understand and appreciate that a methodology can alternatively be represented as a series of interrelated statuses or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices. The following methods facilitate enhanced assessing risk associated with firewall rules.

Referring now to FIG. 7, shown is a flow diagram of an example method 700 configured to facilitate assessing risk associated with firewall rules in accordance with one or more embodiments described herein. Repetitive description of like elements employed in other embodiments described herein is omitted for sake of brevity.

At 702, a device of a network (e.g., service provider network 102) and comprising a processor (e.g., management device 110), receives a request for the device of the network to apply a firewall policy rule to control traffic to a machine of the network, wherein the firewall policy rule comprises information that identifies a remote address from which the traffic is able to originate and a type of the traffic (e.g., via policy generation component 202. At 704, the device analyzes the information based on the request (e.g., via policy evaluation component 304). In particular, at 706, the device determines a remote address risk value representative of a first degree of security risk associated with allowing the traffic to access the machine in response to the traffic being determined to originate from the remote address. At 708, the device determines a traffic type risk value representative of a second degree of security risk associated with allowing the type of traffic to access the machine, and at 710, the device determines a total risk value based on a result of a combination of the remote address risk value and the traffic type risk value.

Referring now to FIG. 8, shown is a flow diagram of another example method 800 configured to facilitate assessing risk associated with firewall rules in accordance with one or more embodiments described herein. Repetitive description of like elements employed in other embodiments described herein is omitted for sake of brevity.

At 802, a device of a network (e.g., service provider network 102) and comprising a processor (e.g., management device 110) analyzes firewall policy information defining traffic authorized to be sent from a machine of the network, the firewall policy information identifying a remote address for a destination to which the traffic is capable of being sent and a type of the traffic (e.g., via policy evaluation component 304). The analyzing can include, at 804, determining a remote address risk value representative of a first degree of security risk associated with allowing the traffic to be sent from the machine to the destination associated with the remote address. The analyzing can further include, at 806, determining a traffic type risk value representative of a second degree of security risk associated with allowing the type of traffic to be sent from the machine. The analyzing can further include at 808, determining a total risk value based on a function of the remote address risk value and the traffic type risk value. At 810, the device can further direct a network device of the network (e.g., a VNIC machine/ device) to apply the firewall policy information to control access of the traffic to the machine in response to a first determination that the firewall policy information is associated with an acceptable degree of security risk based on the total risk value being less than a threshold risk value (e.g., via implementation component 306).

Referring now to FIG. 9, shown is a flow diagram of another example method 900 configured to facilitate assessing risk associated with firewall rules in accordance with one or more embodiments described herein. Repetitive description of like elements employed in other embodiments described herein is omitted for sake of brevity.

At 902, a device of a network (e.g., service provider network 102) and comprising a processor (e.g., management device 110) evaluates a firewall policy rule defining traffic authorized to access a machine of the network, the firewall policy rule comprising information identifying a remote address from which the traffic originates and a type of the traffic (e.g., via policy evaluation component 304). In various embodiments, the evaluating can include, at 904, determining a remote address risk value representative of a first degree of security risk associated with allowing the traffic to access the machine when originating from the remote address. The evaluating can further include, at 906, determining a traffic type risk value representative of a second degree of security risk associated with allowing the type of traffic to access the machine, and at 908, determining a total risk value based on a combination of the remote address risk value and the traffic type risk value. At 910, the device can reject the firewall policy rule based on a determination that the firewall policy rule is associated with an unacceptable degree of security risk based on comparison of the total risk value with a threshold risk value (e.g., via policy evaluation component 304 or policy implementation component 306).

Figure 10:
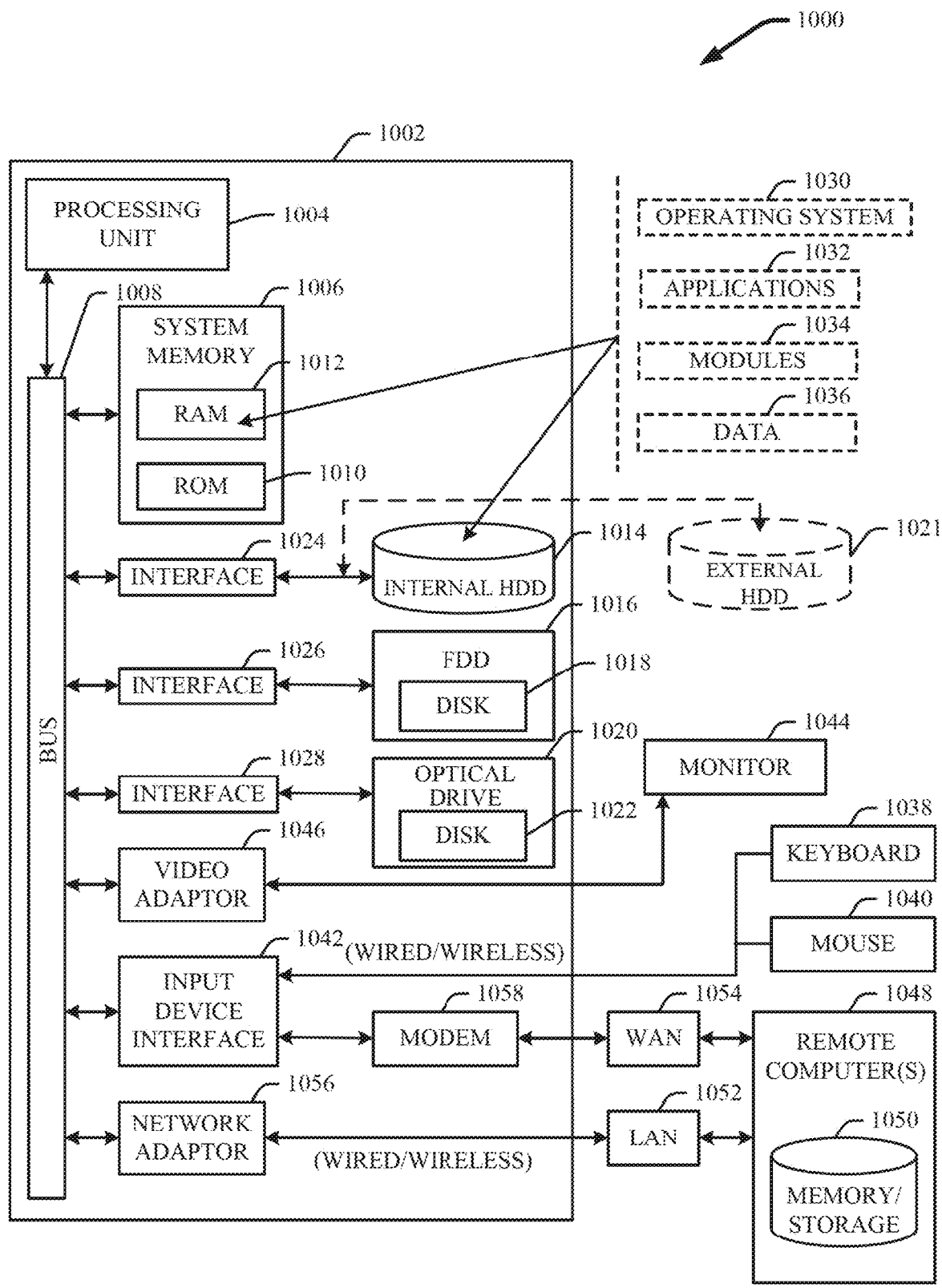
FIG. 10 illustrates a block diagram of a computer operable to facilitate management of communication systems in accordance with one or more embodiments described herein.

FIG. 10 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, management device 102, server devices 106, 108, 100, devices 122, 124 (or a component of management device 102, server devices 106, 108, 100, devices 122, 124).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.10 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 10 Mbps (802.10a) or 54 Mbps (802.10b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a device operatively coupled to a processor, a security risk score that reflects a level of risk of a security rule for control of communication of a machine of a network, wherein the security rule indicates a remote address with which the machine is able to communicate and a type of traffic for the communication, and wherein the determining the security risk score comprises:
   determining a remote address risk value representative of a first degree of security risk associated with the remote address, determining a traffic type risk value representative of a second degree of security risk associated with the type of traffic, and
   determining the security risk score based on a vector determined as a function of the remote address risk value and the traffic type risk value; and
   rejecting, by the device, the security rule to control the communication of the machine based on a determination that the security risk score fails to satisfy an acceptability criterion for the security risk score.

2. The method of claim 1, wherein the communication comprises ingress communication from the remote address to the machine.

3. The method of claim 1, wherein the communication comprises egress communication from the machine to the remote address.

4. The method of claim 1, wherein the machine comprises a virtual machine, wherein the network comprises a virtual network, and wherein the security rule controls passage of traffic through a virtual network interface card that connects the virtual machine to the virtual network.

5. The method of claim 1, wherein the determination comprises a first determination, and wherein the method further comprises:
   applying, by the device, the security rule to control the communication of the machine based on a second determination that the security risk score satisfies the acceptability criterion.

6. The method of claim 1, wherein the determining the remote address risk value comprises determining the remote address risk value based on a number of subnet addresses associated with the remote address, and wherein the remote address risk value increases as the number of the subnet addresses increases.

7. The method of claim 1, wherein the determining the remote address risk value comprises:
   identifying the remote address in a data store comprising risk information identifying degrees of security risk respectively associated with known remote addresses; and
   determining the remote address risk value based on the risk information.

8. The method of claim 1, wherein the type of traffic corresponds to different protocol and port combinations, wherein the determining the traffic type risk value comprises determining the traffic risk value based on a number of the different protocol and port combinations, and wherein the traffic type risk value increases as the number of the different protocol and port combinations increases.

9. The method of claim 1, wherein the determining the traffic type risk value comprises:
   identifying the type of traffic in a data store comprising risk information that identifies degrees of security risk respectively associated with known types of traffic; and
   determining the traffic type risk value based on the risk information.

10. The method of claim 1, wherein the determining the security risk score further comprises determining the security risk score based on a magnitude of the vector.

11. A system comprising:
    a processor; and
    a memory that stores executable instructions that, when executed by the processor, facilitate performance of operations, comprising:
    determining a security risk score that reflects a level of risk of a security rule for controlling communication of a machine of a network, wherein the security rule indicates a remote address with which the machine is able to communicate and a type of traffic for the communication, and wherein the determining the security risk score comprises:

determining a remote address risk value representative of a first degree of security risk associated with the remote address;

determining a traffic type risk value representative of a second degree of security risk associated with the type of traffic; and determining the security risk score based on a vector determined as a function of the remote address risk value and the traffic type risk value; and rejecting the security rule to control the communication of the machine based on a determination that the security risk score fails to satisfy an acceptability criterion for the security risk score.

12. The system of claim 11, wherein the communication comprises ingress communication from the remote address to the machine.

13. The system of claim 11, wherein the communication comprises egress communication from the machine to the remote address.

14. The system of claim 11, wherein the machine comprises a virtual machine, wherein the network comprises a virtual network, and wherein the security rule controls passage of traffic through a virtual network interface card that connects the virtual machine to the virtual network.

15. The system of claim 11, wherein the determination comprises a first determination and wherein the operations further comprise:

applying the security rule to control the communication of the machine based on a second determination that the security risk score satisfies the acceptability criterion.

16. A non-transitory machine-readable medium, comprising executable instructions that, when executed by a processor, facilitate performance of operations, comprising:

determining a security risk score that reflects a level of risk of a security rule for controlling communication of a machine of a network, wherein the security rule indicates a remote address with which the machine can communicate and a type of traffic for the communication, and wherein the determining the security risk score comprises:

determining a remote address risk value representative of a first degree of security risk associated with the remote address;

determining a traffic type risk value representative of a second degree of security risk associated with the type of traffic; and determining the security risk score based on a vector determined as a function of the remote address risk value and the traffic type risk value; and rejecting the security rule to control the communication of the machine based on a determination that the security risk score fails to satisfy an acceptability criterion for the security risk score.

17. The non-transitory machine-readable medium of claim 16, wherein the machine comprises a virtual machine, wherein the network comprises a virtual network, and wherein the security rule controls passage of traffic through a virtual network interface card that connects the virtual machine to the virtual network.

18. The non-transitory machine-readable medium of claim 16, wherein the determination comprises a first determination, and wherein the operations further comprise:

applying the security rule to control the communication of the machine based on a second determination that the security risk score satisfies the acceptability criterion.

19. The non-transitory machine-readable medium of claim 16, wherein the determining the remote address risk value comprises determining the remote address risk value based on a number of subnet addresses associated with the remote address, and wherein the remote address risk value increases as the number of the subnet addresses increases.

20. The non-transitory machine-readable medium of claim 16, wherein the determining the remote address risk value comprises:

identifying the remote address in a data store comprising risk information identifying degrees of security risk respectively associated with known remote addresses; and determining the remote address risk value based on the risk information.

* * * * *